United States Patent [19]
Hur

[11] Patent Number: 5,865,468
[45] Date of Patent: Feb. 2, 1999

[54] KNEE BOLSTER OF A VEHICLE

[75] Inventor: Won-Ho Hur, Bupyung-ku, Rep. of Korea

[73] Assignee: Daewoo Motor Co., Ltd., Rep. of Korea

[21] Appl. No.: 817,213

[22] PCT Filed: Jun. 28, 1996

[86] PCT No.: PCT/KR96/00101

§ 371 Date: Mar. 27, 1997

§ 102(e) Date: Mar. 27, 1997

[87] PCT Pub. No.: WO97/04992

PCT Pub. Date: Feb. 13, 1997

[30] Foreign Application Priority Data

Jul. 28, 1995 [KR] Rep. of Korea ........................ 95-22658

[51] Int. Cl.⁶ ................................................ B60R 21/45
[52] U.S. Cl. ........................................ 280/752; 188/377
[58] Field of Search .................................. 280/752, 751, 280/750, 748; 188/377, 371; 296/70, 72, 189; 180/90

[56] References Cited

U.S. PATENT DOCUMENTS

| | | |
|---|---|---|
| 3,779,595 | 12/1973 | Suzuki et al. ............................ 280/748 |
| 4,032,175 | 6/1977 | Aibe et al. ............................... 280/751 |
| 4,709,943 | 12/1987 | Yoshimura et al. ...................... 280/752 |
| 4,834,422 | 5/1989 | Oikawa et al. ........................... 280/751 |
| 4,934,736 | 6/1990 | Huisman ................................. 280/752 |
| 5,037,130 | 8/1991 | Okuyama ................................ 280/752 |
| 5,156,416 | 10/1992 | Frank ...................................... 280/752 |
| 5,273,314 | 12/1993 | Sakakibara .............................. 280/752 |
| 5,456,494 | 10/1995 | Witkovsky ............................... 280/752 |
| 5,632,507 | 5/1997 | Sinner et al. ............................ 280/752 |

FOREIGN PATENT DOCUMENTS 2 279 627  1/1995  United Kingdom .

*Primary Examiner*—Peter C. English
*Attorney, Agent, or Firm*—McDonnell Boehnen Hulbert & Berghoff

[57] ABSTRACT

An energy absorbing vehicle knee bolster including a main body and a support member. The main body is shaped as a hollow rectangular box and is formed as a single body of an aluminum substance. The support member is fixed to a front side of the main body for supporting the main body on a vehicle tie bar.

12 Claims, 11 Drawing Sheets

FIG.12

KNEE BOLSTER OF A VEHICLE

TECHNICAL FIELD

The present invention relates to a knee bolster of a vehicle, and more particularly to a knee bolster of a vehicle capable of being light in weight and easy in manufacturing, having a favorable shock absorption force in the event of a car crash, effectively decreasing or preventing a submarine phenomena and alleviating an impact applied to a passenger.

BACKGROUND ART

Generally, a front panel of a car chamber within a vehicle is attached with side hinge pillars or A pillars onto the left and right sides thereof, and a tie bar shaped as a pipe is transversely installed across the side hinge pillars provided on both sides. An instrument panel which is fixed to the tie bar is equipped with various adjusting devices of the vehicle such as a speedometer and an audio system and an air bag for protecting passengers.

Meanwhile, when a car crash is taking place, a submarine phenomena occurs such that the lower part of the body of a driver or a passenger occupying an assistant driver's seat is forcibly pushed down to be put under the instrument panel due to the inertia. In this case, the knee of the driver or the passenger sitting on the assistant driver's seat is run into the framework of the vehicle and, furthermore, the upper parts of the bodies of the passengers are inclined to move forward to the bottom side due to the submarine phenomena. Thus, even though the air bag is properly inflated upon the car crash, the upper part of the body hits against the lower side of the air bag or is to be out of the protecting coverage of the air bag. Thus, the air bag is detrimental to effective protection for passengers.

Therefore, a knee bolster is installed to the front of the instrument panel for absorbing the impact upon the driver or passenger occupying the assistant driver's seat during the car crash, so that the impact upon the knee of the passengers is decreased while preventing or reducing the inadvertent influence of the submarine phenomena.

The knee bolster is largely classified into two kinds: one for driver's seat and the other for assistant driver's seat. Here, since an interior package in front of the driver's seat has a different structure from that in front of the assistant driver's seat, the knee bolsters for driver's seat and for assistant driver's seat have different structures.

Typically, the knee bolster is fabricated by a plurality of pieces of steel plate to be coupled with one another via bolts or a welding to involve a lot of working processes, which degrades workability and productivity. In addition to this drawback, the number of the parts constituting the knee bolster is so many to make the part management difficult and dimensional stability be low because of a welding deformation, which, in turn, degrade the workability and assembling productivity.

Also, a substance of the conventional knee bolster is a steel to have a disadvantage of being too heavy, thereby increasing overall weight of the vehicle.

A conventional knee bolster is filled with a foam substance into a hollowed internal space, which also is heavy and so expensive.

Figure 8:
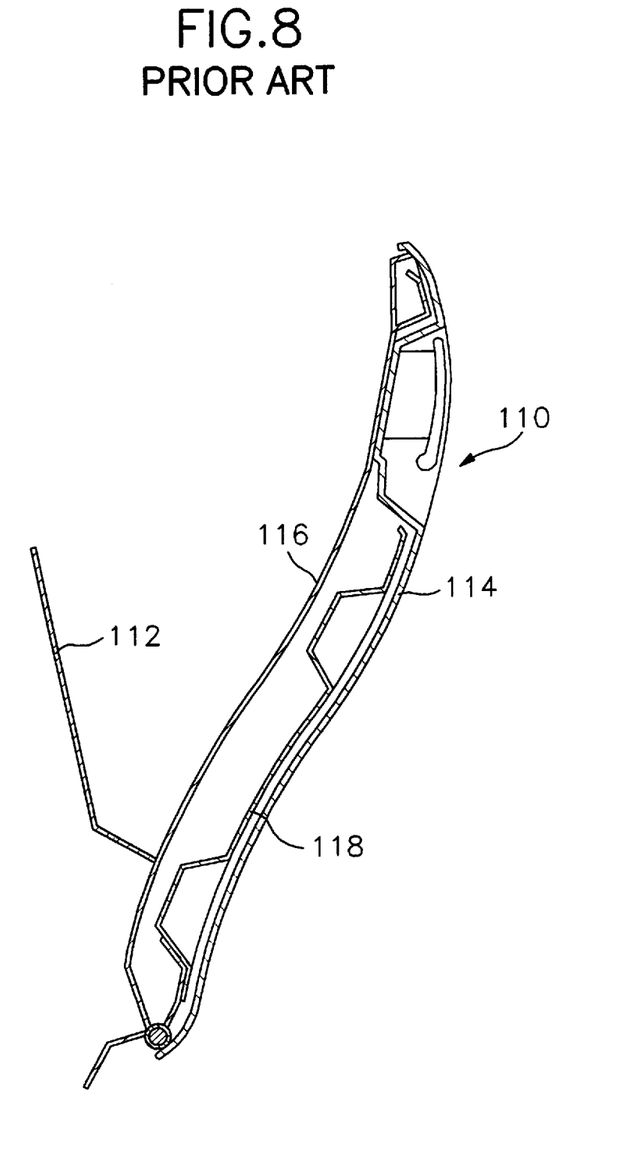
FIG. 8 is a side elevational view showing a generally conventional knee bolster.

FIG. 8 is a sectional view showing a general knee bolster 110 for assistant driver's seat. Knee bolster 110 is installed to an instrument panel (not shown) in front of the assistant driver's seat of an automobile to be integrally formed with a glove box 112 in a body. As shown in FIG. 8, knee bolster 110 includes an outer plate 114, an inner plate 116 and a shock absorbing plate 118 installed between outer plate 114 and inner plate 116. The shock absorbing plate 118 is formed of a steel.

In the conventional knee bolster formed as above, when the passenger collides against outer plate 114 of the knee bolster resulting from a car crash, the impact force caused by the collision is transferred to shock absorbing plate 118. If the impact force is slight, the stiffness of shock absorbing plate 118 elastically bears the impact force. Whereas, shock absorbing plate 118 is plastic-deformed by a strong impact force to absorb and eliminate the impact force.

In conventional knee bolster 110 described as above, however, the impact force is absorbed only by shock absorbing plate 118 formed of steel. Accordingly, the submarine phenomena cannot be prevented when the impact force is significantly powerful to be out of the confines of the deformation. What's worse, since shock absorbing plate 118 is formed of the steel, the impact applied to the passenger resulting from shock absorbing plate 118 is notably great as much, as a consequence, it has a drawback of involving a danger that the passenger is highly liable to be injured.

Figure 9:
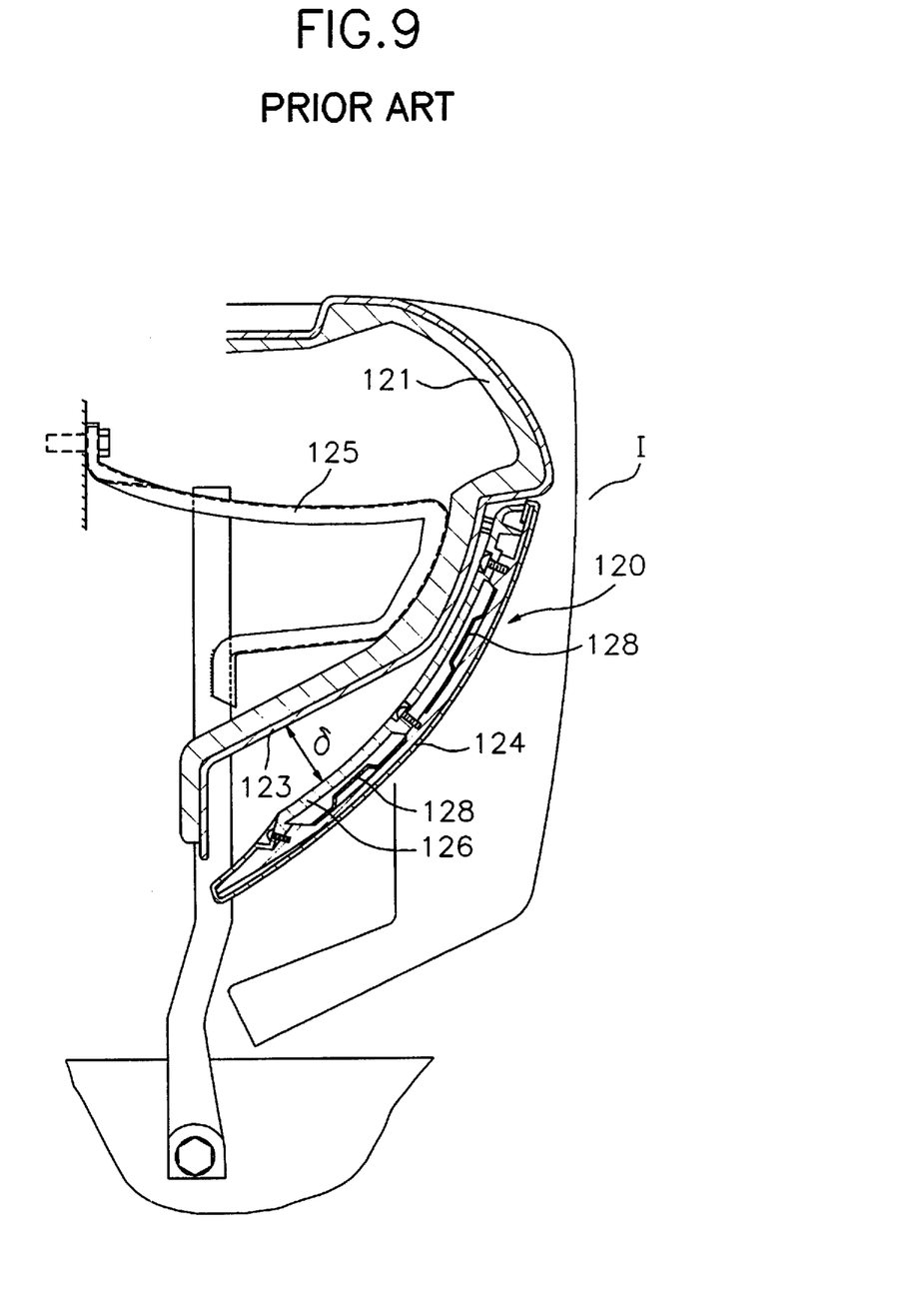
FIG. 9 is a side elevational view showing another generally conventional knee bolster.

U.S. Pat. Nos. 4,662,649, 4,834,422, 5,071,162 and 5,312,133 disclose knee bolsters for automobiles which are related prior arts. Among these, U.S. Pat. No. 5,071,162 issued to Takagawa dated in Dec. 10, 1992 describes a knee bolster 120 for assistant driver's seat, in which an impact volume in the car crash is doubly absorbed by both a steel plate 128 and a urethane member 121. Knee bolster 120, as shown in FIG. 9, is provided with a steel plate 128 between an outer plate 124 and an inner plate 126 and a reinforcing plate 123 attached with a urethane member 121 onto the inner surface thereof. Inner plate 126 and reinforcing plate 123 are spaced apart from each other by an interval of δ. A reference number I denotes an instrument panel.

In the event of the car crash, the knee of the passenger presses outer plate 124 of knee bolster 120, and steel plate 128 primarily tolerates the impact force while being inwardly plastic-deformed. After steel plate 128 contacts reinforcing plate 123, reinforcing plate 123 secondarily absorbs the impact force.

However, above-described knee bolster 120 requires separate reinforcing plate 123, and it is very difficult to mold the urethane corresponding to the shape of reinforcing plate 123. Moreover, since inner plate 126 and reinforcing plate 123 are spaced apart from each other by the interval of δ the shock absorbing effect by urethane member 121 is relatively slight. Furthermore, urethane member 121 is adhered to reinforcing plate 123 which is then supported by a support member 125 without being additionally supported. For this construction, urethane member 121 cannot effectively afford a reaction force with respect to a passenger who imposes the impact force. Consequently, it can be noted that the shock absorbing effect by urethane member 121 is trivial.

In addition, support member 125 has a complicated structure and supports merely a portion of reinforcing plate 123. Thus, the reaction force afforded by reinforcing plate 123 is relatively weak.

DISCLOSURE OF INVENTION

The present invention is devised to solve the foregoing problems. It is an object of the present invention to provide a knee bolster of a vehicle capable of enhancing workability and assembling productivity, having a favorable shock absorbing capacity during a car crash and decreasing or preventing a submarine phenomena.

It is another object of the present invention to provide a knee bolster of a vehicle for decreasing a car weight to make the vehicle light.

It is still another object of the present invention to provide a knee bolster for assistant driver's seat, wherein an impact force upon a car crash is absorbed in both ways to prevent the occurrence of a submarine phenomena with respect to a passenger sitting on the assistant driver's seat while reducing an impact caused by the knee bolster to be applied to the passenger on the assistant driver's seat.

To achieve the above object of the present invention, a knee bolster of a vehicle includes a knee bolster main body which is fabricated by a single body of an aluminum substance for absorbing an impact in the event of a car crash and is shaped as a hollowed rectangular box, and at least one knee bolster main body support member which is fixed to the front plane of the knee bolster main body for supporting the knee bolster main body to a tie bar of the vehicle.

Here, at least one knee bolster main body support member is fixed to at least one pair of fixtures formed to the front plane of the knee bolster main body, and at least one pair of fixtures form a clearance slidably fitted with the knee bolster main body support member in cooperation with the front plane of the knee bolster main body, respectively.

Preferably, at least one pair of knee bolster main body support members have a pair of projections fitted into the clearances of the respective fixtures and a semi-circular gripping part formed to be opposite to the pair of projections for gripping the tie bar. More preferably, the gripping part of the knee bolster main body support member is coupled to the tie bar via a bonding.

It is also preferable that the knee bolster main body further includes a plurality of reinforcing plates installed to a hollowed internal wall in the horizontal direction, in which the reinforcing plate has a bending portion in a zig-zag form for easily bringing about a rupture when the impact is applied to the knee bolster main body.

Furthermore, the knee bolster main body preferably includes a coupling unit which is coupled with a side hinge pillar and a frame assembly instrument panel center of the vehicle.

According to an alternative aspect of the present invention, a knee bolster of a vehicle includes a knee bolster main body fabricated by a single body of an aluminum substance for absorbing an impact in the event of a car crash and shaped as a hollowed rectangular box, and at least one knee bolster main body support member fixed to the front plane of the knee bolster main body for supporting the knee bolster main body to a tie bar of the vehicle. Here, the knee bolster main body is provided with a cutaway portion for accommodating a steering column cover of the vehicle in the upper central portion thereof, and at least one pair of fixtures are furnished to the front plane of the knee bolster main body for fixing the at least one knee bolster main body support member.

At this time, at least one pair of fixtures may form a clearance slidably fitted with the knee bolster main body support member in cooperation with the front plane of the knee bolster main body, respectively. In addition, at least one pair of knee bolster main body support members may include a pair of projections fitted into the clearances of the respective fixtures and a semi-circular gripping part formed to be opposite to the pair of projections for gripping the tie bar.

Preferably, the gripping part of the knee bolster main body support member is coupled to the tie bar via a bonding, and the knee bolster main body further includes a plurality of reinforcing plates installed to a hollowed internal wall in the horizontal direction.

Furthermore, it is preferable that the reinforcing plate has a bending portion in a zig-zag form for easily bringing about a rupture when the impact is applied to the knee bolster main body, and the knee bolster main body has a coupling unit which is coupled with a side hinge pillar and a frame assembly instrument panel center of the vehicle.

Therefore, the knee bolster according to the first and second embodiments of the present invention is formed of the single body of aluminum substance to enhance workability and assembling productivity, abolish fastidious part management, and accomplish lightweight of the vehicle. Besides, the knee bolster main body and knee bolster main body support member are coupled via the fitting manner to contrive further improvement of the workability and assembling productivity.

According to still another alternative aspect of the present invention, a knee bolster of a vehicle according to a third embodiment includes a first shock absorbing member for primarily absorbing an impact force by a passenger sitting on a driver's assistant seat in the event of a car crash, and a second shock absorbing member closely attached to the first shock absorbing member for secondarily absorbing the impact force. The second shock absorbing member is supported by a supporting unit which is firmly fixed to a frame of the vehicle by a fixing unit.

The first shock absorbing member includes an inner plate, an outer plate and a steel plate insertedly fixed between the inner plate and outer plate, and the second absorbing member may have a front plane with an uneven rough profile and a rear plane closely attached to the inner plate.

Preferably, the knee bolster further has a glove box integrally formed with the first shock absorbing member and a swing unit for swinging the first shock absorbing member, in which the glove box is installed to the inner plane of the inner plate.

It is also preferable that a foam as the second shock absorbing member is formed with an indented portion capable of accommodating the glove box in the central bottom portion of the rear plane thereof. More preferably, the swing unit includes a plurality of first hinge brackets provided to the lower end of the steel plate, and a plurality of second hinge brackets fixed to the frame of the vehicle, in which the first hinge brackets are coupled to the second hinge brackets to be able to swing about a plurality of hinge pins.

More preferably, the supporting unit includes a supporting plate having a great stiffness closely coupled to the front plane of the foam and two support brackets fixed to both side of the frontal bottom end of the supporting plate. Also, the supporting plate has an uneven rough profile corresponding to the front plane of the foam to prevent the foam from being separated from the supporting plate or up and down shaking.

Additionally, the supporting plate is fabricated by an aluminum, and respective support brackets have an upper section, a lower section and a connection section for connecting the upper section and lower section, respectively.

It is preferable that the upper section is fixed to the supporting plate by means of screws or bolts coupled by piercing through the upper section and supporting plate, the connection section directly and pressively contacts the lower plane of the foam, and the lower section is fixed to the second hinge bracket. At this time, the fixing unit includes two L-shaped side brackets for fixedly supporting the supporting plate.

Preferably, either one of the two L-shaped side brackets is fixed to a center frame and the other one is fixed to an A pillar.

Consequently, the knee bolster of the vehicle according to the third embodiment of the present invention has the relatively simple structure and facilitates the manufacturing thereof while effectively protecting the passengers. Of course, the lightweight of the vehicle is effectively attained when selecting the aluminum as the substance of the supporting plate.

BRIEF DESCRIPTION OF THE DRAWINGS

The above objects and other advantages of the present invention will become more apparent by describing in detail preferred embodiments thereof with reference to the attached drawings in which.

BEST MODE FOR CARRYING OUT OF THE INVENTION

A first embodiment, a second embodiment and a third embodiment of a knee bolster of a vehicle according to the present invention will be described in detail with reference to accompanying drawings.

FIGS. 1 to 6 illustrate the knee bolster of the vehicle according to the first embodiment of the present invention.

Figure 1:
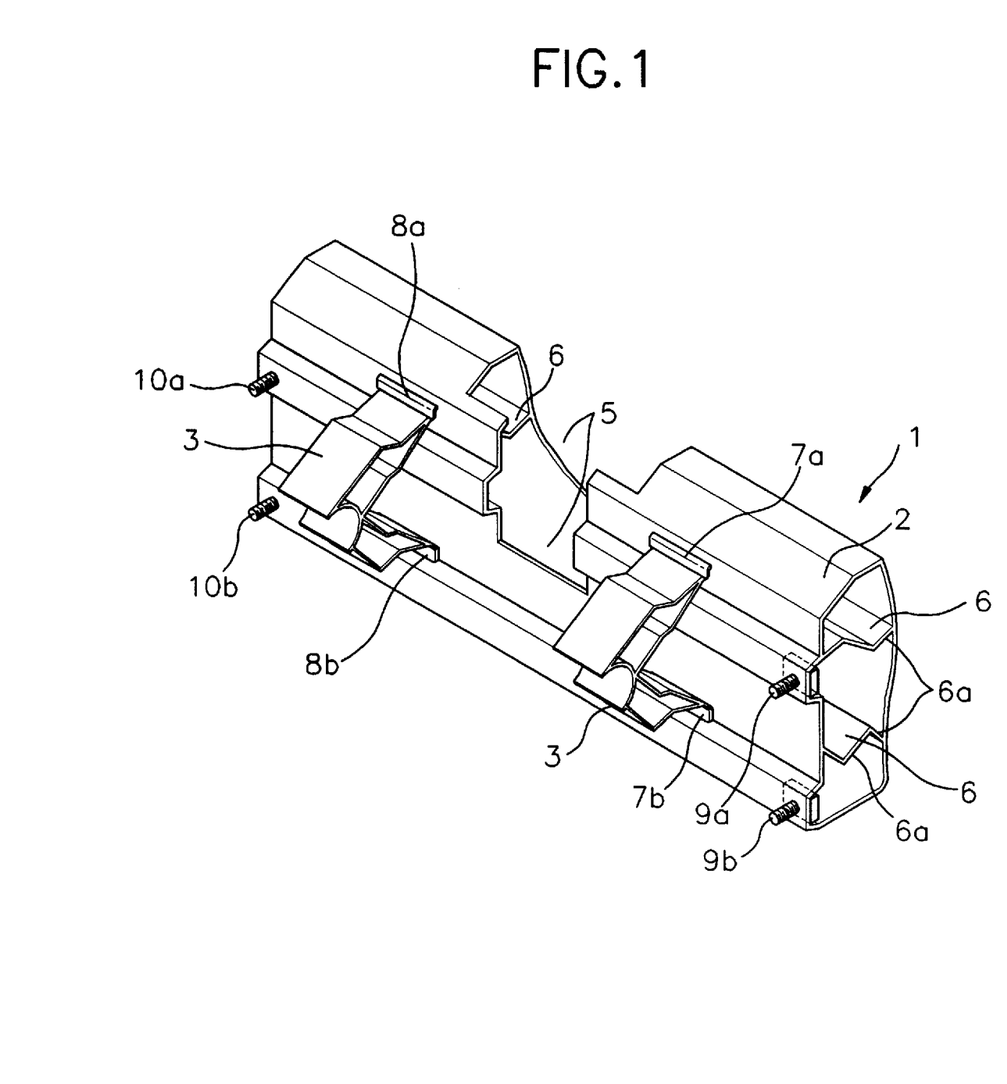
FIG. 1 is a perspective view showing a knee bolster of a vehicle for a driver according to a first embodiment of the present invention.
Figure 2:
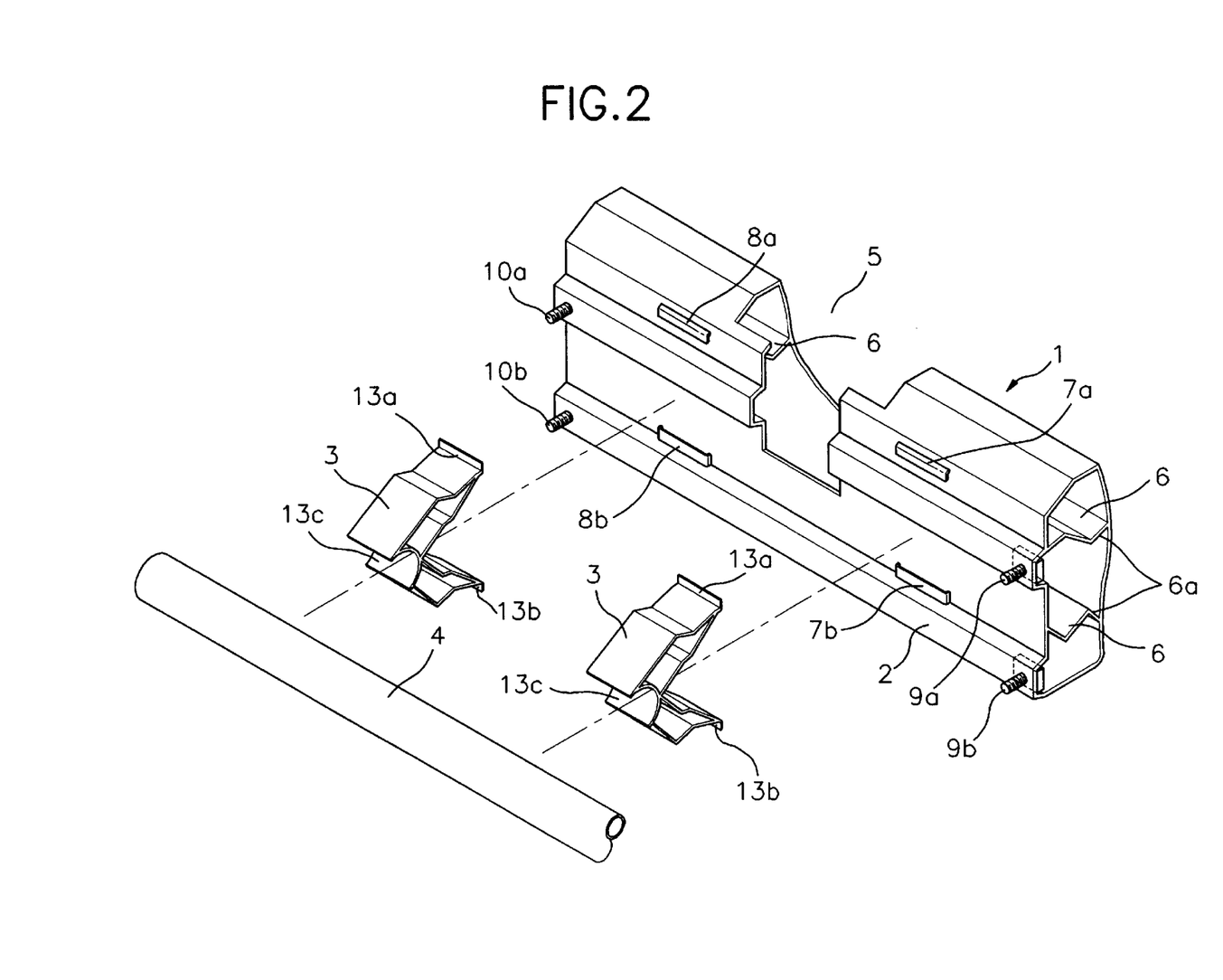
FIG. 2 is an exploded perspective view showing a state that the knee bolster main body support member is separated from the knee bolster main body of FIG. 1.
Figure 3:
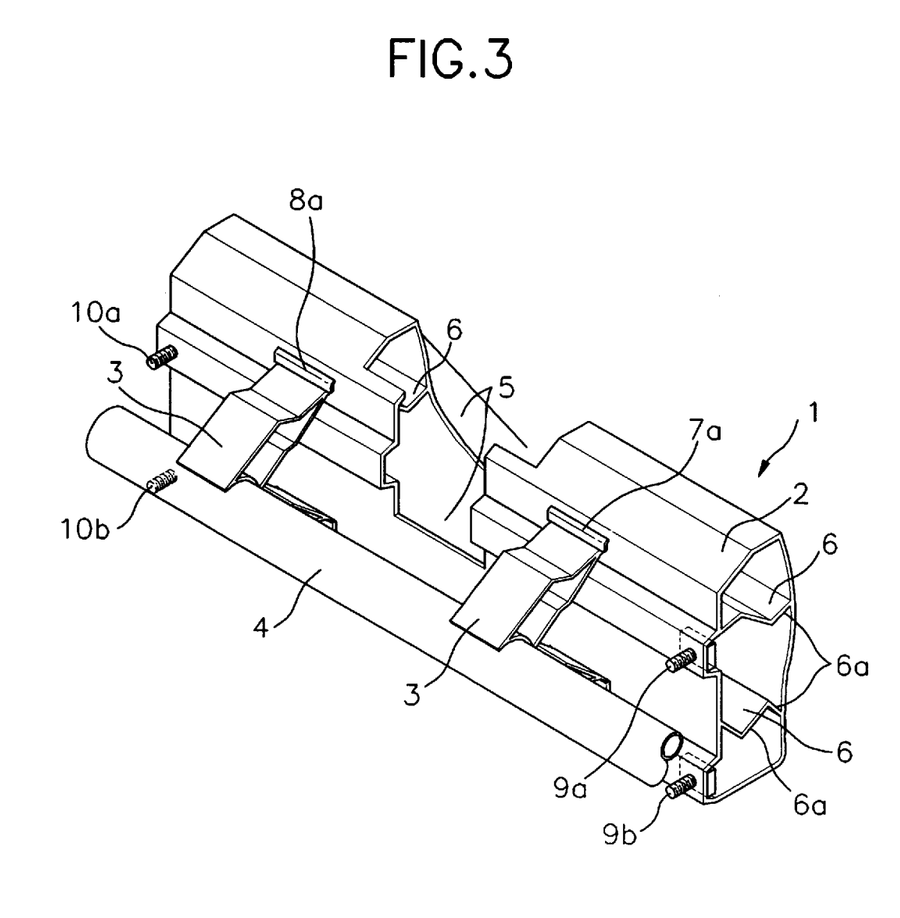
FIG. 3 is a perspective view showing a state that the knee bolster shown in FIG. 2 is fixed to a tie bar.

FIG. 1 is a perspective view of knee bolster 1 for a driver showing a state that a knee bolster main body support member 3 is coupled to a knee bolster main body 2, and FIG. 2 is an exploded perspective view showing a state that knee bolster main body support member 3 is separated from knee bolster main body 2. FIG. 3 is a perspective view showing a state that knee bolster 1 is supported by a tie bar 4 of the vehicle by knee bolster main body support member 3.

Figure 4:
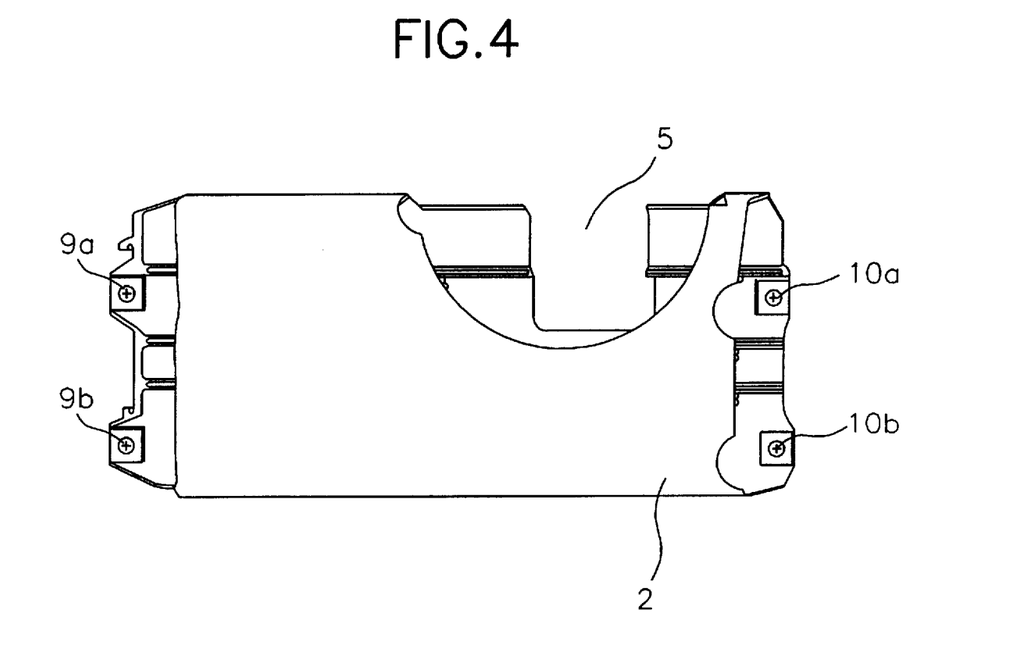
FIG. 4 is a rear view of the knee bolster shown in FIG. 1.

Referring to FIGS. 1, 2 and 3, knee bolster 1 includes knee bolster main body 2 for absorbing an impact during a car crash and knee bolster main body support member 3 which supports knee bolster main body 2 to tie bar 4. Knee bolster main body 2 is shaped as a hollowed rectangular box having both sides opened. A cutaway portion 5 for receiving a steering column cover (not shown) is formed in the upper central portion of knee bolster main body 2. Cutaway portion 5 has a substantially rectangular shape at the front side of knee bolster 2 and has a semicircular shape at the rear side of knee bolster main body 2 as shown in FIG. 4. The front side of knee bolster main body 2 has a plurality of step planes, and the rear side thereof has a gently-curved surface. A plurality of reinforcing plates 6 are horizontally installed to the inner wall of hollowed knee bolster main body 2 for elastically absorbing the impact produced during the car crash. Horizontal reinforcing plate 6 is bent in a zig-zag form to bring about a rupture at a bending portion 6a of reinforcing plate 6 when knee bolster main body 2 is applied with the impact, thereby further enhancing the absorption of the impact.

A plurality of pairs, preferably two pairs of fixtures 7a & 7b and 8a & 8b, for fixing knee bolster main body support member 3 are formed to the front side of knee bolster main body 2.

Figure 5:
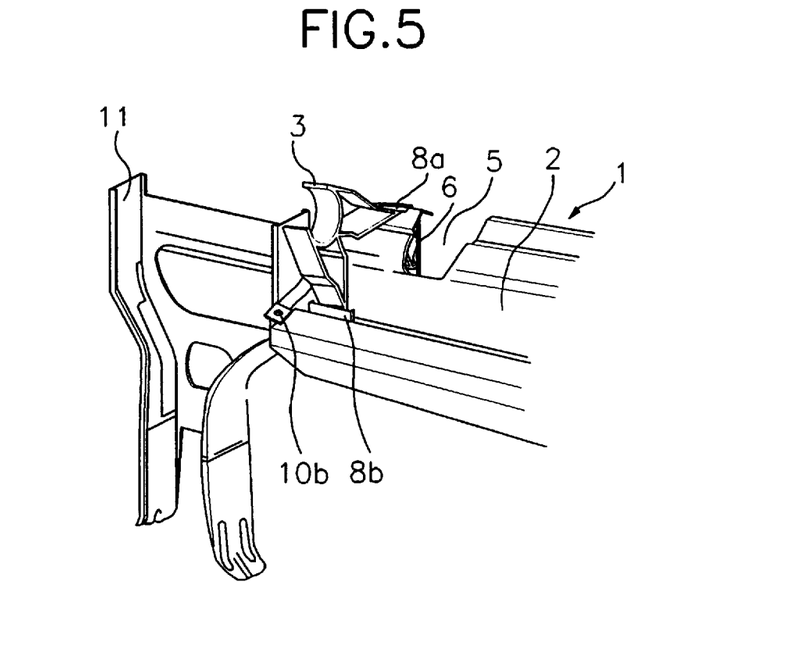
FIG. 5 is a perspective view showing a state that the knee bolster of FIG. 1 is fixed to a instrument panel center frame assembly.
Figure 6:
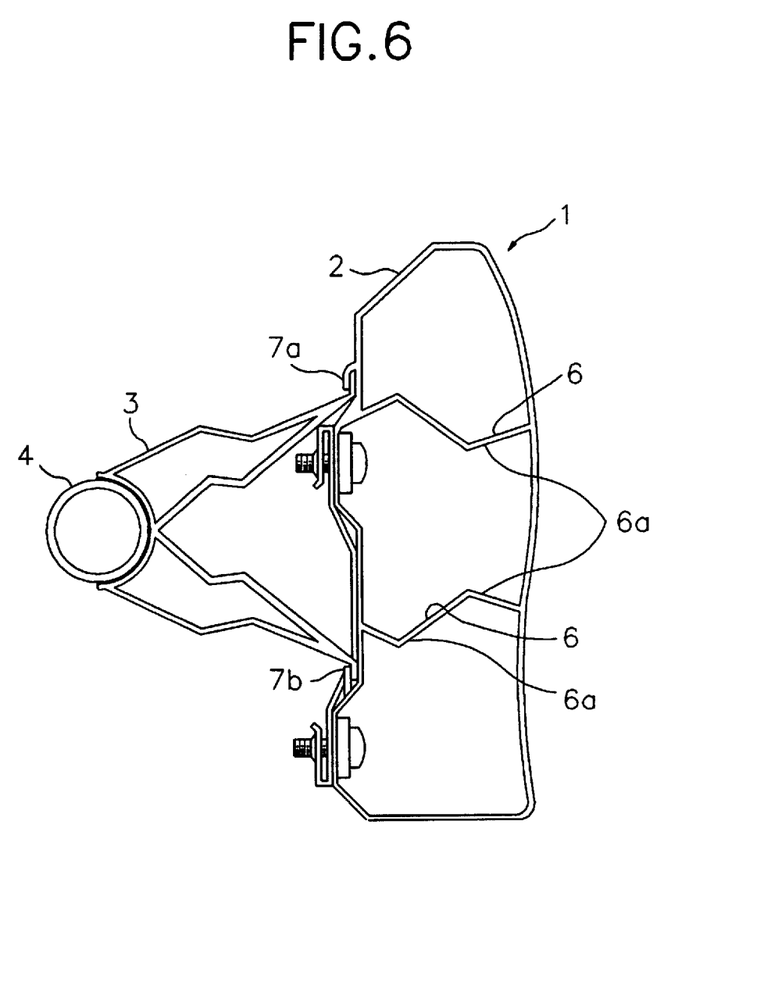
FIG. 6 is a side view of the knee bolster shown in FIG. 3.

As shown in FIG. 6, upper fixtures 7a and 8a constitute respective pairs together with corresponding lower fixtures 7b and 8b. Respective free ends of upper and lower fixtures 7a & 7b and 8a & 8b of respective pairs are formed to have a clearance from the front side of knee bolster main body 2 while being installed to inwardly oppose to each other. Both lateral ends of the front side of knee bolster main body 2 are formed with two pairs of coupling members, e.g., bolts 9a & 9b and 10a & 10b. Here, bolts 9a and 9b are coupled to a side hinge pillar (not shown) and bolts 10a and 10b are coupled to brackets of a instrument panel center frame assembly (refer to FIG. 4 and FIG. 5).

According to the first embodiment of the present invention, knee bolster main body 2 is formed by a single body of an aluminum substance which has a favorable shock absorption force and impact-resistant property.

Preferably, in addition to fixing one side of knee bolster main body 2 to the side hinge pillar by means of the coupling parts such as bolts 9a & 9b and 10a & 10b, and fixing the other side thereof to instrument panel center frame assembly 11 as shown in FIG. 5, knee bolster main body 2 is firmly supported by tie bar 4 via knee bolster main body support member 3 for more securely absorbing the impact upon the car crash and reducing/preventing the submarine phenomena of the passenger.

As shown in FIGS. 1, 2, 3 and 6, respective knee bolster main body support members 3 are equipped with a pair of projections 13a and 13b slidably fitted along the front side of knee bolster main body 2 into the clearances of fixtures 7a & 7b and 8a & 8b of knee bolster main body 2 from the side of the clearance between fixtures 7a & 7b and 8a & 8b at first end portion thereof. Projections 13a and 13b are formed to outwardly oppose to each other to be inserted into the clearance between fixtures 7a & 7b and 8a & 8b.

Knee bolster main body support member 3 is formed with a semi-circular gripping part 13c coupled with tie bar 4 to a second end portion thereof. Gripping part 13c has a dimension corresponding to the diameter of tie bar 4 for easily gripping tie bar 4. When knee bolster main body support member 3 is fixed to tie bar 4, it is preferable that an adhesive is applied to the inner concave surface of gripping part 13c to be coupled to tie bar 4 via a bonding for improving a workability efficiency.

Figure 7:
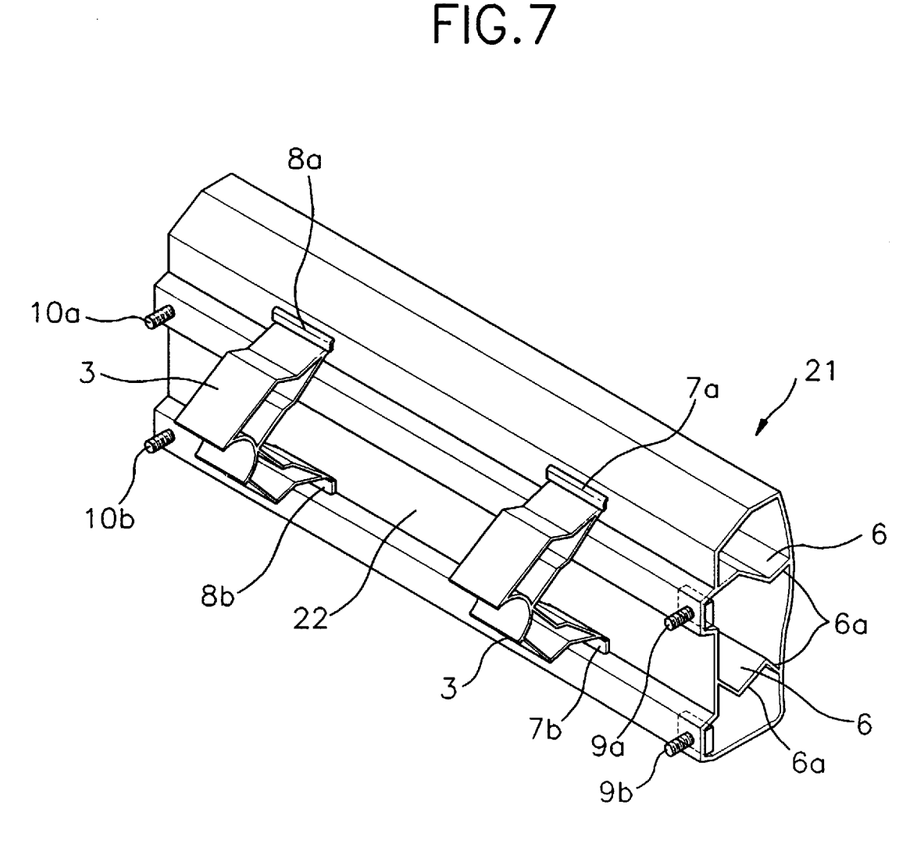
FIG. 7 is a perspective view showing the knee bolster of the vehicle for a passenger on the assistant driver's seat according to a second embodiment of the present invention.

FIG. 7 illustrates a knee bolster 21 for a passenger on an assistant driver's seat according to a second embodiment of the present invention. A different particular of knee bolster 21 shown in FIG. 7 from knee bolster 1 shown in FIG. 1 is in that the cutaway portion is not formed in the upper central portion of a knee bolster main body 22. This is because no steering column cover of the vehicle is required to knee bolster 21 for the passenger on the assistant driver's seat. Therefore, knee bolster 21 for the passenger on the assistant driver's seat has the same structure as knee bolster 1 for the driver shown in FIG. 1 except the cutaway portion for being inserted with the steering column cover, detailed description thereof will thus not be repeated.

As described above, the knee bolster according to the first and second embodiments of the present invention is fabricated by the single body of the aluminum substance to enhance the workability, facilitate the manufacturing and decrease the weight, thereby permitting to contrive the lightweight of the vehicle.

Besides that the knee bolster is attached to the side hinge pillar and instrument panel center frame assembly, it is fixed to the tie bar by means of the knee bolster main body support member to be effective in absorbing the impact without being deviated from the original position and the submarine phenomena can be decreased or prevented.

Also, the knee bolster main body support member slides to be simply fitted into the fixtures of the knee bolster main body to improve the assembling productivity.

Figure 10:
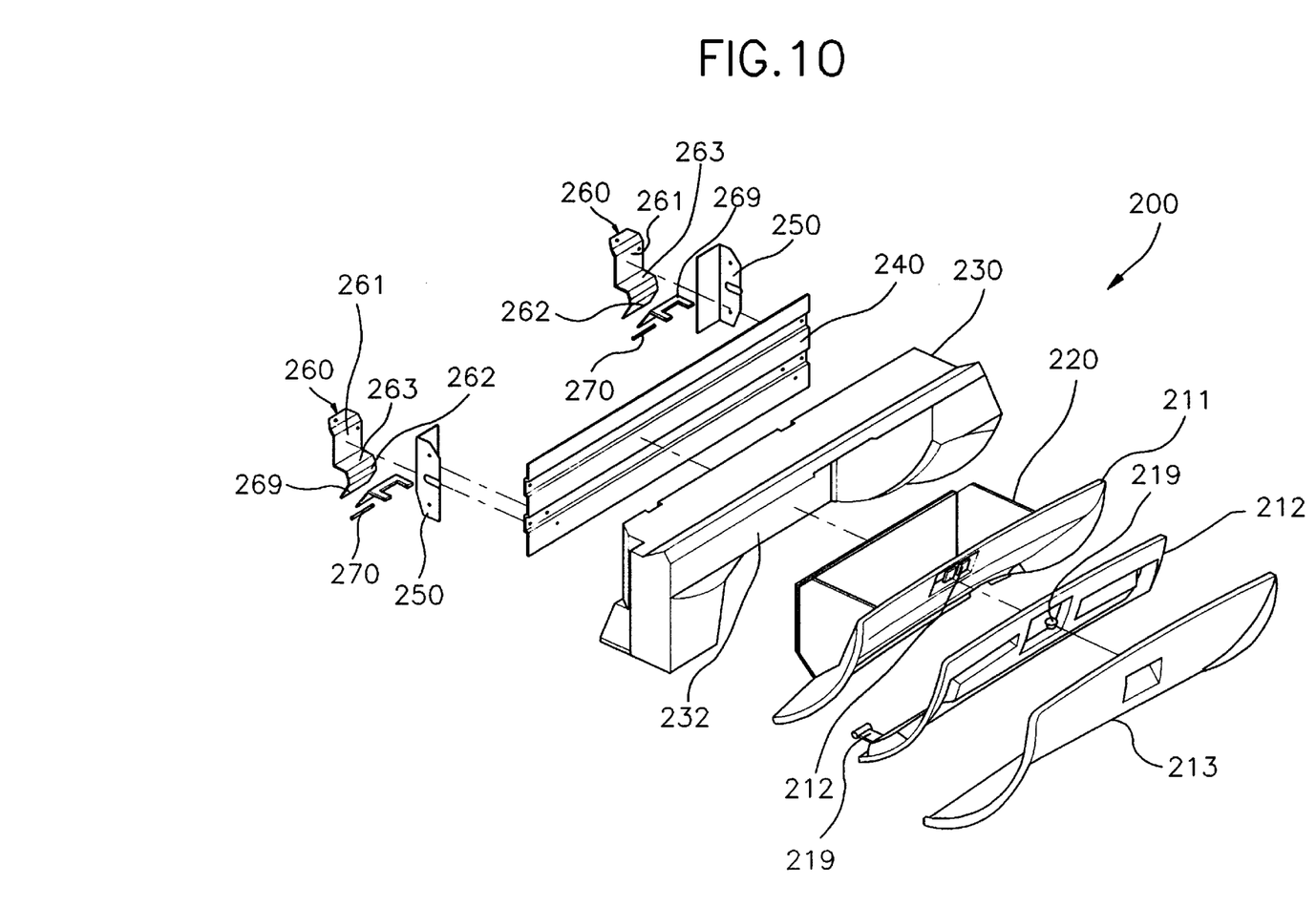
FIG. 10 is an exploded perspective view showing the knee bolster of the vehicle for the assistant driver's seat according to a third embodiment of the present invention.
Figure 11:
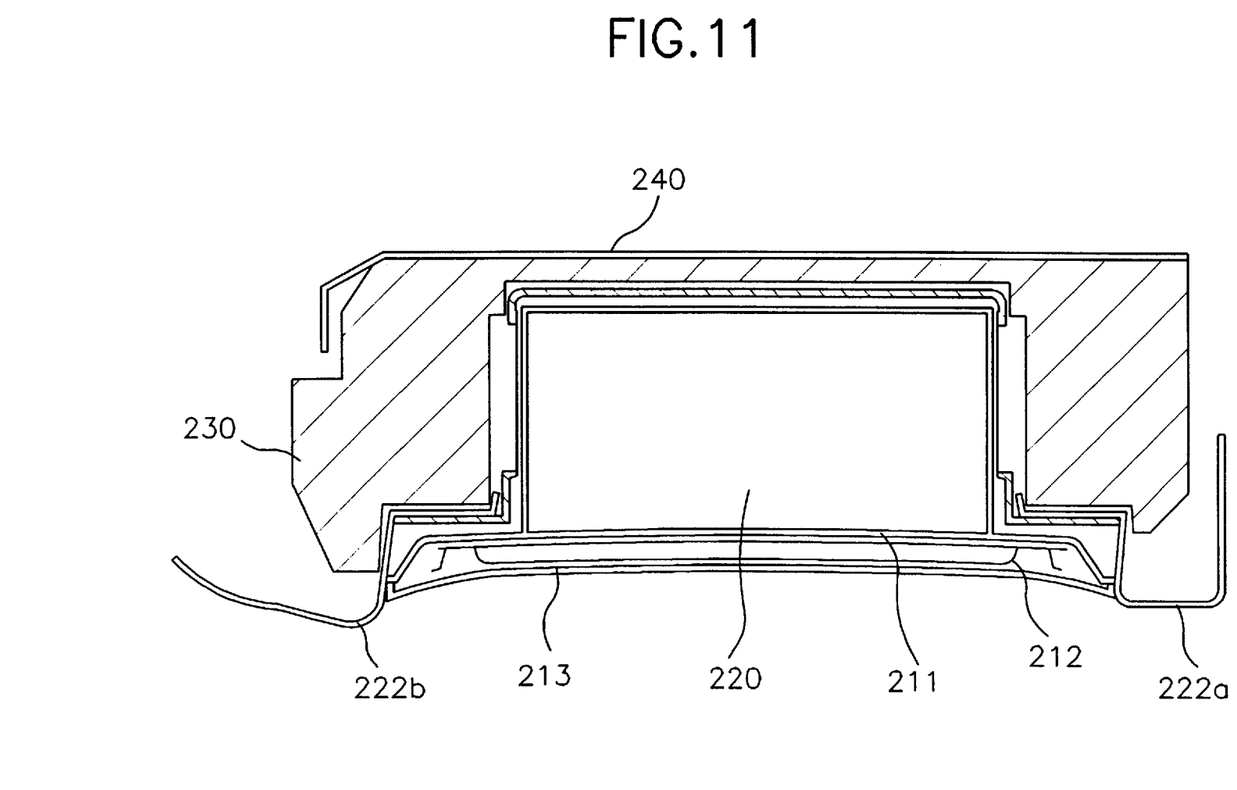
FIG. 11 is a cross-sectional view showing the knee bolster of FIG. 10.

FIG. 10 is an exploded perspective view of knee bolster 200 according to a third embodiment of the present invention. FIG. 11 is a cross-sectional view and FIG. 12 is a side elevational view showing the knee bolster of FIG. 10, respectively.

Figure 12:
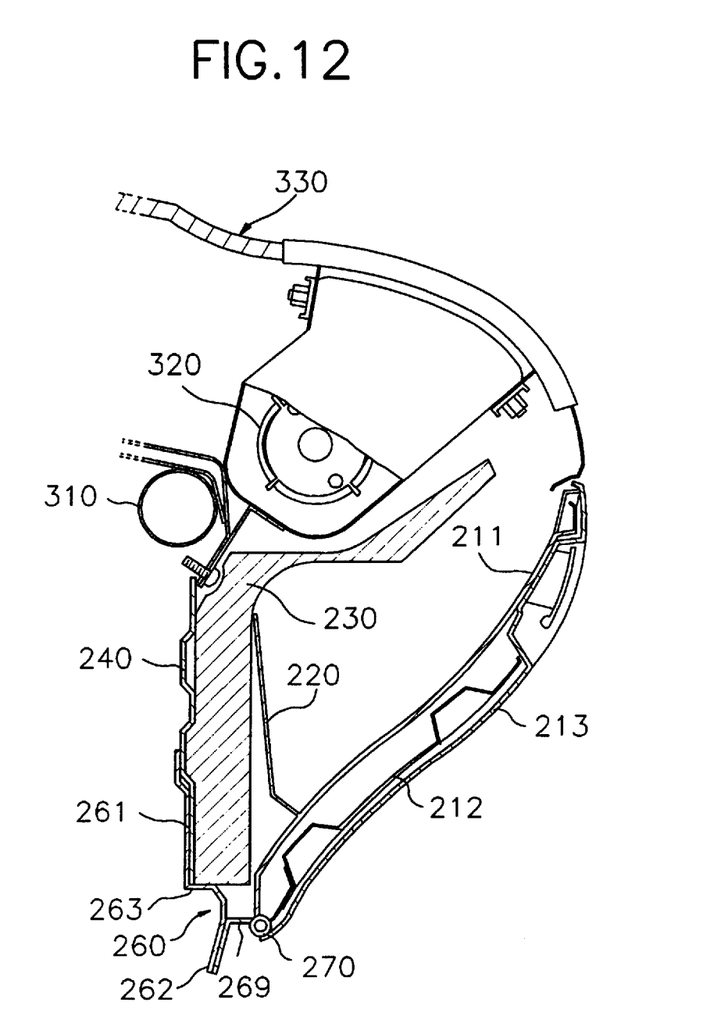
FIG. 12 is a side elevational view showing the knee bolster of FIG. 10.

As shown in FIGS. 10, 11 and 12, knee bolster 200 includes a steel plate 212 for primarily absorbing the impact from the knee of the passenger in case of the car crash and a foam 230 for secondarily absorbing the impact. Steel plate 212 is installed between an outer plate 213 and an inner plate 211 which is integrally-formed with a glove box 220 in a body. Two first hinge brackets 219 are integrally-formed to the lower end of steel plate 212.

Foam 230 is installed to allow the rear side thereof to closely attach to inner plate 211 and is supported by a supporting plate 240. The front plane of foam 230 is shaped to have an uneven rough profile, and the bottom center of the rear plane thereof is provided with an indented portion 232 capable of retaining glove box 220.

Supporting plate 240 has an uneven rough profile corresponding to the front plane of foam 230 to further easily prevent the separation of foam 230 from supporting plate 240 or the up and down shaking when foam 230 is closely coupled with supporting plate 240. Supporting plate 240 has a great stiffness, and is more preferably formed of an aluminum for attaining the lightweight of the vehicle.

Two support brackets 260 are fixed to both ends of the front plane of supporting plate 240. Respective support brackets 260 are provided with an upper section 261, a lower section 262 and a connection section 263 for connecting upper section 261 with lower section 262. Upper section 261 of support bracket 260 is fixed to supporting plate 240 by means of a part such as screws and bolts coupled by piercing through upper section 261 and supporting plate 240. Connection section 263 directly and pressively contacts the lower plane of foam 230, and is fixed to a second hinge bracket 269.

Meantime, supporting plate 240 is fixed to a frame of the vehicle by two L-shaped side brackets 250, in which side bracket 250 of one side is fixed to a center frame (not shown) and side bracket 250 of the other side is fixed to an A pillar (not shown).

Second hinge bracket 269 is hingedly-coupled with first hinge bracket 219 of steel plate 212 by means of a hinge pin 270. By doing so, mutually-coupled inner plate 211, outer plate 213 and steel plate 212 are capable of swinging about hinge pin 270, and glove box 220 can be opened/closed by swinging the mutually-coupled plates.

In FIGS. 10, 11 and 12, reference numerals 221, 222a, 222b, 310, 320 and 330 respectively denote a glove box knob, a side cover, a side cover, a tie bar, an air bag and an instrument panel.

The knee bolster according to the third embodiment of the present invention having the above-described structure is operated as below during the car crash. Once the car crash happens, the knee of the passenger applies the impact force upon outer plate 213. Such impact force is transferred to steel plate 212 and, at the same time, is directly transmitted to foam 230 closely attached to inner plate 211 via inner plate 211.

If the impact force is slight, the reaction force is elastically applied to the knee of the passenger by the stiffness of steel plate 212 to prevent the submarine phenomena. Meanwhile, when the impact force is so great to exceed the elastic limit of steel plate 212, foam 230 closely attached to inner plate 211 prevents/reduces the deformation of steel plate 212 while tolerating the force imposed by the passenger's knee, thereby preventing the submarine phenomena.

At this time, foam 230 is supported by supporting plate 240 which has the distinct stiffness and is firmly fixed to the frame of the vehicle by side brackets 250. Therefore, foam 230 sufficiently absorbs the impact force to effectively prevent the submarine phenomena and significantly reduces the reaction force with respect to the passenger, so that the hurt and injury against the passenger can be minimized.

On the other hand, when glove box 220 is needed, glove box knob 221 is pushed or pulled out to swing mutually-coupled inner plate 211, outer plate 213 and steel plate 212 about hinge pin 270 to open/close glove box 220. Glove box 220 is accommodated into indented portion 232 when glove box 220 is closed.

As described above, the knee bolster according to the third embodiment of the present invention is effective in not only preventing the submarine phenomena during the car crash but also reducing the injury against the lower part of the passenger's body heretofore originated from the conventional knee bolster.

Also, foam 230 effectively absorbs the impact force by the support of supporting plate 240, and supporting plate 240 is closely attached to foam 230 rarely involving a gap. By this construction, supporting plate 240 can be fabricated by a substance having a relatively lower hardness to more effectively protect the passenger from the injury and hurt.

Additionally, the knee bolster has the relatively simple structure and is easily manufactured while effectively protecting the passenger.

Furthermore, by adopting the aluminum as the substance of supporting plate 240, the lightweight of the vehicle is effectively realized.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A knee bolster of a vehicle comprising:

a knee bolster main body fabricated of a single body of an aluminum substance for absorbing an impact in the event of a car crash and shaped as a hollow rectangular box having a length, width, and height and a front side with at least one pair of fixtures; and at least one knee bolster main body support member fixed on the front side of said knee bolster main body for supporting said knee bolster main body on a tie bar of said vehicle; wherein said at least one knee bolster main body support member is fixed to the at least one pair of fixtures on said front side of said knee bolster main body, and each fixture of said at least one pair of fixtures forms a clearance in cooperation with said front side of said knee bolster main body and is slidably fitted with said knee bolster main body support member.

2. A knee bolster of a vehicle as claimed in claim 1, wherein said at least one knee bolster main body support member comprises a pair of projections fitted into said clearances of said fixtures and a semi-circular gripping part formed opposite to said pair of projections for gripping said tie bar.

3. A knee bolster of a vehicle as claimed in claim 2, wherein said gripping part of said knee bolster main body support member is coupled to said tie bar via an adhesive.

4. A knee bolster of a vehicle as claimed in claim 1, wherein said knee bolster main body further comprises a plurality of reinforcing plates installed to an internal wall of the hollow knee bolster main body in a direction parallel to the length of the knee bolster main body.

5. A knee bolster of a vehicle as claimed in claim 4, wherein each of said plurality of reinforcing plates comprises a bending portion in a zig-zag form for easily bringing about a rupture when said impact is applied to said knee bolster main body.

6. A knee bolster of a vehicle as claimed in claim 5, wherein said knee bolster main body comprises coupling means for being coupled with a side hinge pillar and an instrument panel center frame assembly of said vehicle.

7. A knee bolster of a vehicle comprising:

a knee bolster main body fabricated of a single body of an aluminum substance for absorbing an impact in the event of a car crash and shaped as a hollow rectangular box having a length, width, and height and a front side; and at least one knee bolster main body support member fixed on the front side of said knee bolster main body for supporting said knee bolster main body on a tie bar of said vehicle; and wherein said knee bolster main body is provided with a cutaway portion for accommodating a steering column cover of said vehicle in an upper central portion thereof and at least one pair of fixtures are formed on said front side of said knee bolster main body for fixing said at least one knee bolster main body support member, wherein each fixture of said at least one pair of fixtures forms a clearance in cooperation with said front side of said knee bolster main body and is slidably fitted with said knee bolster main body support member.

8. A knee bolster of a vehicle as claimed in claim 7, wherein said at least one knee bolster main body support member comprises a pair of projections fitted into said clearances of said fixtures and a semi-circular gripping part formed opposite to said pair of projections for gripping said tie bar.

9. A knee bolster of a vehicle as claimed in claim 8, wherein said gripping part of said knee bolster main body support member is coupled to said tie bar via an adhesive.

10. A knee bolster of a vehicle as claimed in claim 7, wherein said knee bolster main body further comprises a plurality of reinforcing plates installed to a hollow internal wall of the hollow knee bolster main body in a direction parallel to the length of the knee bolster main body.

11. A knee bolster of a vehicle as claimed in claim 10, wherein each of said plurality of reinforcing plates comprises a bending portion in a zig-zag form for easily bringing about a rupture when said impact is applied to said knee bolster main body.

12. A knee bolster of a vehicle as claimed in claim 11, wherein said knee bolster main body comprises coupling means for being coupled with a side hinge pillar and an instrument panel center frame assembly of said vehicle.

* * * * *